Patented Dec. 7, 1937

2,101,332

UNITED STATES PATENT OFFICE 2,101,332

PROCESS OF PRODUCING SYNTHETIC RESINS

Walter Frankenburger, Herbert Hammerschmid, and Georg Roessler, Ludwigshafen-on-the-Rhine, Germany, assignors to I. G. Farbenindustrie Aktiengesellschaft, Frankfort-on-the-Main, Germany No Drawing. Application January 30, 1937, Serial No. 123,293. In Germany February 5, 1936

4 Claims. (Cl. 260—130)

The present invention relates to a process of producing synthetic resins.

It has already been proposed to condense aliphatic aldehydes, as for example acetaldehyde, aldol, crotonaldehyde and the like, in the presence of primary or secondary amines to form a mixture of oils and resins. The resins thus obtained have, however, disadvantages, as for example sticking when polished, dark color, disappearance of the lustre and comparatively slight resistance to water, which impair their use in practice.

We have now found that valuable synthetic resins are obtained by condensing aliphatic aldehydes containing from 2 to 4 carbon atoms by means of primary or secondary alkylamines or aralkylamines or secondary heterocyclic bases or their salts with weak acids, the resulting resinous products being treated with formic acid before, during or after the distilling off of the readily volatile oils simultaneously formed. The resins thus obtained have considerable advantages over those already known. They are paler, more readily capable of being polished, more waterproof and more readily soluble in organic solvents. Primary or secondary alkylamines, aralkylamines or secondary heterocyclic bases or their salts with weak acids suitable for the present process are for example methylamine, ethylamine, butylamine, benzylamine and the corresponding diamines or piperidine as well as their salts with acetic acid, propionic acid, butyric acid, glycolic acid and lactic acid. If desired polyvalent alcohols, such as glycerine or glycol or also resin acids, such as colophony or the various abietic acids, contained therein, may be present in the reaction mixture.

The treatment of the resins formed with formic acid may be carried out at elevated temperatures, especially while boiling. In this way in particular the capability of polishing the resins and also the hardness, waterproof properties and lustre of the polishes prepared therefrom are improved.

The resins thus obtained, in addition to their use as polishes, may also be used for resin lacquers, for impregnations, for electrical purposes, for sound records and quite generally in all cases where otherwise valuable natural resins, such as shellac, are used.

The following examples will further illustrate how the present invention may be carried out in practice but the invention is not restricted to these examples. The parts are by weight.

Example 1

75 parts of diethylamine lactate are added to a mixture of 1400 parts of acetaldehyde and 150 parts of glycerine, and the mixture is boiled for six hours under reflux. After separating the water formed, 90 parts of formic acid are added and the whole is boiled for another hour. After distillation, there are obtained as a residue 800 parts of a resin having a softening point of 87° C.

Example 2

20 parts of piperidine are allowed to flow slowly into 520 parts of crotonaldehyde and 60 parts of ethylene glycol, the whole then being boiled under reflux for several hours. In the subsequent distillation in vacuo, 92 parts of water and 175 parts of oil are obtained. The viscous residue is then boiled with 60 parts of formic acid for several hours, and the product again subjected to distillation.

Example 3

30 parts of diethylamine are allowed to flow slowly into a mixture 470 parts of acetaldehyde and 60 parts of glycerine. By reason of the heat of reaction, the temperature of the mixture rises to about 100° C. during the course of two hours. The whole is then boiled for four hours under reflux, the water formed is separated, 17 parts of formic acid are added and the whole again boiled for a short time. After distilling off the readily volatile constituents, 350 parts of a pale resin are obtained.

Example 4

150 parts of anhydrous formic acid are added to 3000 parts of a condensation product derived from acetaldehyde and diethylamine in the proportions 15:1 and the whole is boiled for half an hour. After distilling off 600 parts of oil and water, there remain 2500 parts of resin having a softening point of 60° C.

Example 5

130 parts of anhydrous formic acid are added to 1300 parts of a condensation product derived from acetaldehyde and diethylamine in the proportions 15:1 and the whole boiled for half an hour. After distilling off the readily volatile oils formed a pale resin is obtained as the residue.

Example 6

200 parts of a colophony as free as possible from hydroxy-acid (for example WW brand) are dissolved in a mixture of 2400 parts of water and 225 parts of diethylamine. 2760 parts of acetaldehyde are allowed to flow in during the course of about an hour while cooling with water. The whole is then heated to boiling for two hours. After cooling, the water (about 3500 parts) is separated and the resulting resin boiled for half an hour with about 200 parts of formic acid. The volatile constituents are separated by distillation and a pale resin is obtained as the residue.

What we claim is:

1. A process of producing synthetic resins which comprises condensing aliphatic aldehydes containing from 2 to 4 carbon atoms by means of a substance of the group of primary and secondary alkyl- and aralkylamines, secondary heterocyclic bases and their salts with weak acids and treating the resulting resinous products with formic acid while boiling.

2. A process of producing synthetic resins which comprises condensing aliphatic aldehydes containing from 2 to 4 carbon atoms in admixture with a polyvalent alcohol by means of a substance of the group of primary and secondary alkyl- and aralkylamines, secondary heterocyclic bases and their salts with weak acids and treating the resulting resinous products with formic acid while boiling.

3. A process of producing synthetic resins which comprises condensing aliphatic aldehydes containing from 2 to 4 carbon atoms in admixture with a resin acid by means of a substance of the group of primary and secondary alkyl- and aralkylamines, secondary heterocyclic bases and their salts with weak acids and treating the resulting resinous products with formic acid while boiling.

4. A process of producing synthetic resins which comprises condensing aliphatic aldehydes containing from 2 to 4 carbon atoms by means of diethylamine and treating the resulting resinous products with formic acid while boiling.

WALTER FRANKENBURGER.
HERBERT HAMMERSCHMID.
GEORG ROESSLER.